No. 740,502. Patented October 6, 1903.

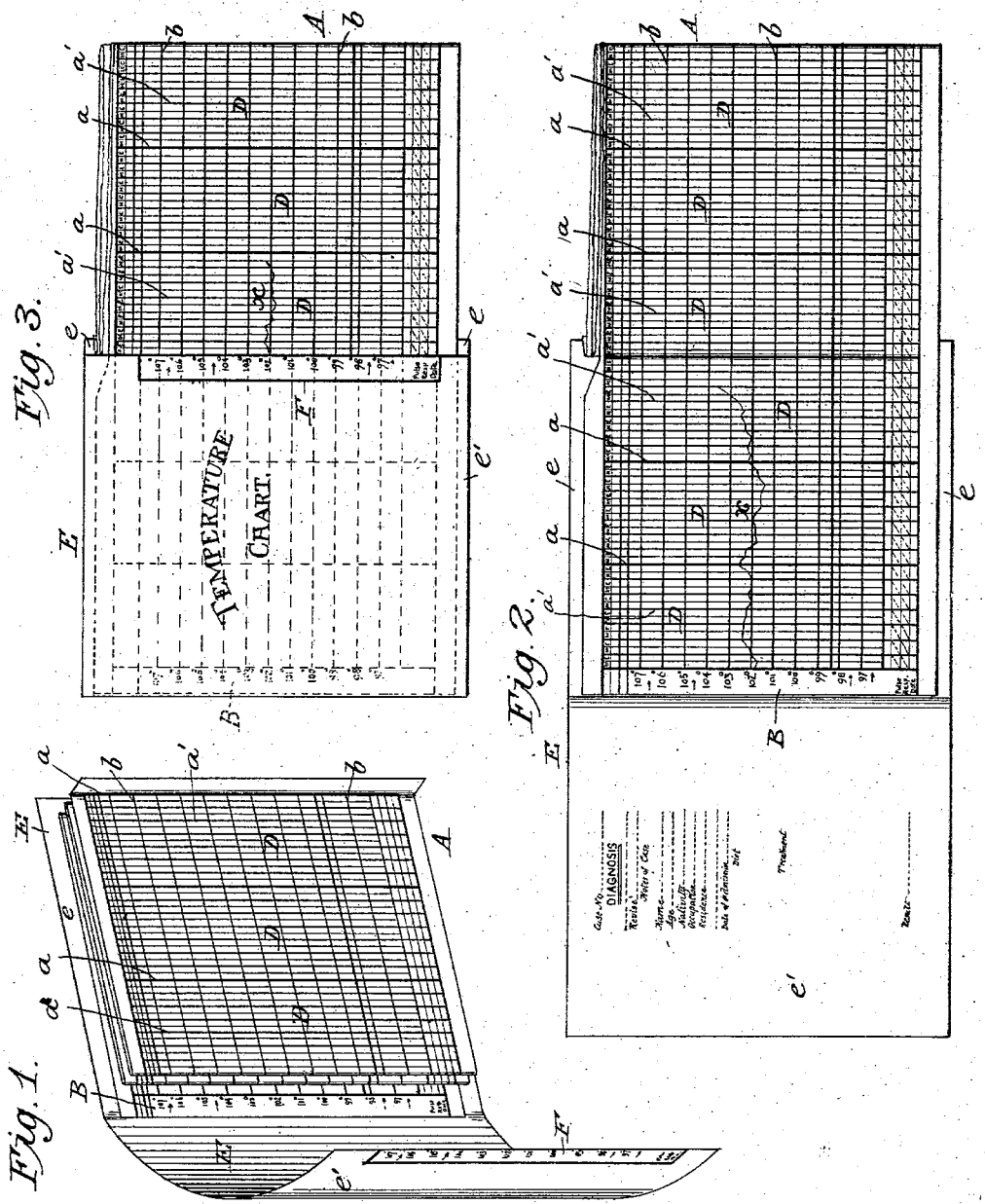

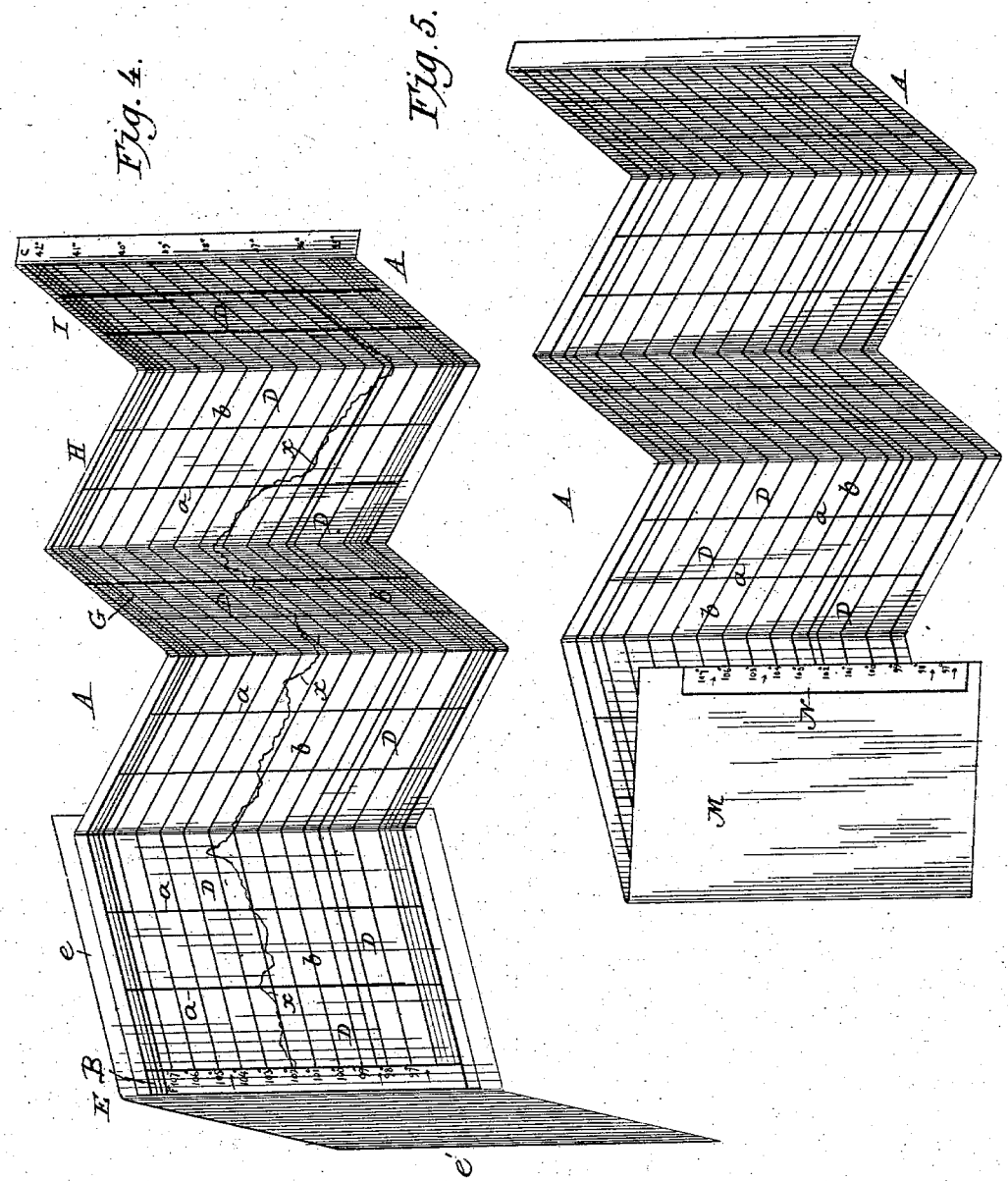

UNITED STATES PATENT OFFICE.

OTTILIE WIDER, OF WASHINGTON, DISTRICT OF COLUMBIA.

TEMPERATURE-CHART.

SPECIFICATION forming part of Letters Patent No. 740,502, dated October 6, 1903.

Application filed June 30, 1903. Serial No. 163,670. (No model.)

*To all whom it may concern:*

Be it known that I, OTTILIE WIDER, trained nurse, a subject of the Emperor of Germany, residing at Washington, District of Columbia, have invented certain new and useful Improvements in Temperature-Charts, of which the following is a specification.

In all serious cases of illness it is customary for the nurse to keep a daily record of the temperature of the patient. Charts have been provided for this purpose; but they have always been arranged to receive a record for a limited time, usually three weeks, and when the case is a protracted one it has been customary to attach an additional chart to the right-hand end of the first one and, if necessary, to attach successive charts in like manner. When the chart is made very long in this way, it is difficult to read it properly, as the scale or graduation marks are only made at the left-hand end of the chart, and the eye often fails to follow the proper lines leading to the part of the chart where the record is being made.

The object of my invention is to provide a chart of sufficient size or length for the most protracted cases and to so arrange it that without in any way interfering with the continuity of the record the latter may be accurately made and read.

In the accompanying drawings, Figure 1 is a perspective view of a temperature-chart made in accordance with my invention, the record-sheet or chart proper being folded, while the front or cover is opened to expose the interior. Fig. 2 shows a plan view of my improved chart with the record-sheet partly broken away and partly unfolded, the front of the cover being also turned back. Fig. 3 is a plan view with the record-sheet of the chart partly broken away, the front of the cover being closed and the record-sheet partly unfolded. Fig. 4 is a perspective view of the chart with the front of the cover thrown open and the several folds of the chart or record-sheet drawn out. Fig. 5 is a perspective view of a modification.

The record-sheet or chart proper, A, is ruled similarly to those now in general use in Washington, District of Columbia, and other cities. The vertical lines $a$ divide the chart into spaces which are subdivided by lines $a'$ into fourteen equal parts, representing the morning and evening of the seven days of the week. At the left-hand end of the record-sheet is a temperature-scale B, and horizontal lines $b$ extend from the different parts of the scale horizontally from end to end of the sheet. Usually the spaces between the lines $b$ are divided by four additional lines into five spaces, indicating fifths of a degree. These lines are omitted in the drawings. Heretofore these charts have usually had but three spaces D, lasting three weeks, and when the case was protracted it has been customary to attach another chart to the right-hand end of the first one and to in like manner add additional charts when necessary. I employ a record-sheet of sufficient length for the most protracted case. As indicated in Fig. 4, I preferably print the sheet in such manner that it may be used for fifteen weeks. Of course the record-sheet is printed on a single piece of paper, and it is folded in the manner indicated in Fig. 4 and also in Fig. 1. I attach the left-hand end of the record-sheet to a cover E, which preferably has a back $e$ and a front $e'$. On the right-hand vertical edge of the front of the cover I print a temperature-scale F, corresponding in all respects with the temperature-scale B on the record-sheet and being in line therewith, as indicated in Fig. 3, where the scale B is indicated by dotted lines. On the inside of the front of the cover I preferably print blanks for memorandum as to the diagnosis of the case.

When commencing to use the chart, the front of the cover is thrown back, as indicated in Fig. 2, and the first fold is opened, as there indicated. Then the record may be made, as indicated by the line $x$, for, say, three weeks; but if it is attempted to continue the record for three weeks longer it will be seen that the distance from the temperature-scale B will be increased to such an extent that the eye cannot conveniently follow the lines, so that after the first fold has been filled the front of the cover is turned over or closed in the manner indicated in Fig. 3, when the temperature-scale F will be made to register with the proper lines $b$ on the second fold or section of the record-sheet, and a continuous record may be proceeded with without departing to a great extent from the scale. After the second section is thus filled the record-sheet is folded over upon the first section thereof, thus bringing the part G of the record-sheet face upward within the cover and close to the scale B. After the part G is filled the cover is turned down in the manner indicated in Fig. 3, and the record proceeds on the part H. Then the sheet is folded again and the front of the cover is thrown back, the part I of the sheet then being arranged close to the scale B. Usually charts of this kind have centigrade temperature-scales at the right-hand end of the sheet, as indicated in Fig. 4; but they are seldom used, and I do not consider them a necessary part of the chart.

Instead of employing a separate sheet for the cover I may continue the left-hand end of the record-sheet to provide a portion M to form a cover and corresponding in all respects to the front of the cover E, and the scale N may be printed near the vertical right-hand edge of this cover. The inner scale corresponds in position and all other respects to the scale B. (Shown in Figs. 1 to 4, inclusive.)

In the particular chart shown in Fig. 5 a single piece of paper may be employed, printed on two sides, and it is not necessary to paste any of the parts together.

I claim as my invention—

1. A temperature-chart having a portion folded over upon the record-sheet at one end and provided with a temperature-scale on the outside of the folded-over portion, and another temperature-scale on the reverse side of the chart near the line of folding.

2. A temperature-chart having a portion folded over upon the record-sheet at one end and provided with a temperature-scale near the right-hand edge of the outside of the folded-over portion, and also another temperature-scale on the reverse side of the chart near the line of folding.

3. A temperature-record sheet folded upon itself and secured within a cover and having a temperature-scale near its left-hand edge, while the cover has a temperature-scale on the outside of its front portion near its right-hand edge.

In testimony whereof I have hereunto subscribed my name.

OTTILIE WIDER.

Witnesses:
LLOYD B. WIGHT,
A. M. PARKINS.